United States Patent Office 3,008,950

Patented Nov. 14, 1961

3,008,950

RED MONOAZO-DYESTUFFS

Johannes Heyna, Frankfurt am Main, Karl Sommer, Konigstein (Taunus), and Arthur Siebert and Klaus Berner, Frankfurt am Main, Germany, assignors to Farbwerke Hoechst Aktiengesellschaft vormals Meister Lucius & Brüning, Frankfurt am Main, Germany, a corporation of Germany No Drawing. Filed July 6, 1960, Ser. No. 41,032
Claims priority, application Germany July 11, 1959
3 Claims. (Cl. 260—199)

The present invention provides new red monoazo-dyestuffs, more particularly it relates to azo-dyestuffs which correspond to the following formula

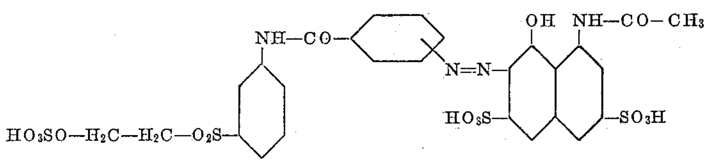

wherein the azo-group stands in one of the positions meta and para to the NH—CO-group.

We have found that valuable red monoazo-dyestuffs which are readily soluble in water are obtained by diazotizing an amine of the following formula

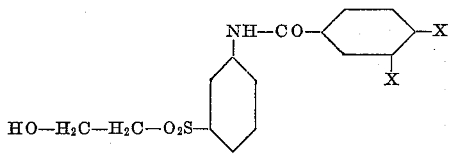

wherein one X represents hydrogen and the other X represents an amino group, in the form of its acid sulfuric acid ester and coupling it with 1-acetylamino-8-hydroxynaphthalene-3.6-disulfonic acid. The amines used as starting materials may be prepared, for example, by reacting nitrobenzoyl chlorides in an aqueous solution with 1-aminobenzene-3-$\beta$-hydroxyethylsulfone in the presence of alkalies and subsequently reducing the nitro group to the amino group.

The particular value of the new dyestuffs is due to the fact that they possess a good affinity for the fiber and that they are, therefore, especially suitable as dyestuffs for dyeing processes. They can be fixed on cellulose fibers in the presence of alkaline agents and yield dyeings and prints of good fastness to wet processing. Moreover, the dyeings produced are distinguished by a brilliancy of the tint and a good fastness to light. As compared with dyestuffs in which the azo-group and the hydroxyethylsulfone sulfuric acid ester group are bound on the same benzene nucleus, the new dyestuffs have the advantage of a considerably improved affinity for native and regenerated cellulose fibers.

The following examples serve to illustrate the invention but they are not intended to limit it thereto; the parts being by weight unless otherwise stated, and the relationship of parts by weight to parts by volume being the same as that of the kilogram to the liter.

*Example 1*

150 parts of concentrated sulfuric acid of 98% strength are added to 12.7 parts of nitrosyl-sulfuric acid and 32 parts of 1-(4′-amino-benzoyl-amino)-benzene-3-$\beta$-hydroxyethylsulfone (melting point 150–152° C.) are introduced into the mixture. The temperature shall not exceed 30° C. When the product is completely dissolved, the whole is stirred for 3 hours at room temperature and then run into 500 parts of ice and 300 parts by volume of water. The precipitated diazo compound is filtered off with suction and, while wet, strewed into a solution of 36.1 parts of 1-acetylamino-8-hydroxynaphthalene-3.6-disulfonic acid in 240 parts by volume of water to which a weakly acid solution of 13.6 parts of crystalline sodium acetate, 1.4 parts of acetic acid of 100% strength and 15 parts of potassium chloride in 80 parts by volume of water has been added. The coupling liquor is then made up to 440 parts by volume and stirred for 1 hour until the coupling is complete. A further 30 parts of potassium chloride are then strewed into the dyestuff solution and the whole is stirred for at least 12 hours. The precipitated dyestuff is filtered off with suction and dried at 70° C. in the circulating chamber.

94.8 parts of a dark red powder are obtained which dissolves in water to give a red solution. It is suitable as printing dyestuff, more particularly as dyestuff for dyeing processes. Thus there are obtained from salt-containing dyeing baths, in the cold or in the hot, with the aid of alkalies on native and regenerated cellulose fibers red dyeings of good fastness to wet processing, a good fastness to light and a high brilliancy. A good dyeing result is also obtained when cellulose fibers are impregnated with an aqueous solution of the dyestuff and the material so treated is reacted in the cold or in the hot with alkalies which may be applied to the material prior to, simultaneously with or after the dyestuff. Depending upon the temperature conditions and the kind of alkali selected, the duration of action may vary within a few seconds and about 24 hours.

*Example 2*

80 parts of concentrated sulfuric acid of 98% strength are cooled in a freezing mixture, while stirring, and 6.9 parts of pulverized and dried sodium nitrite are introduced so slowly that the temperature does not exceed +10° C. When the introduction is complete, stirring is continued for 10 minutes, the freezing mixture is removed and replaced by cold water. When the contents of the vessel have reached the temperature of the water, the mixture is slowly heated to 70° C. and this temperature is maintained for about 30 minutes, while constantly stirring, until the nitrite is completely dissolved. The whole is then allowed to cool to room temperature, 90 parts of concentrated sulfuric acid are added thereto and 32 parts of 1-(3′-amino-benzoylamino)-benzene-3-$\beta$-hydroxyethylsulfone melting at 150–151° C. are introduced. The preparation of the diazo salt, the coupling and the isolation of the dyestuff are carried out as described in Example 1. 92 parts of a red powder are obtained which dissolves in water to give a red solution. It may be used, as disclosed in Example 1, as printing dyestuff and dyestuff for dyeing processes. Yellowish red dyeings of good properties of fastness are obtained.

We claim:
1. The monoazo-dyestuffs which correspond to the following formula
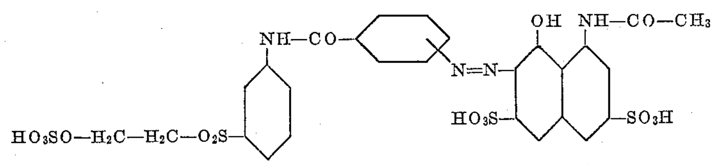
wherein the azo-group stands in one of the positions meta and para to the NH—CO-group.
2. The monoazo-dyestuff which corresponds to the following formula
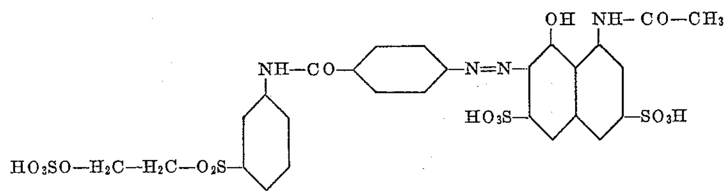
3. The monoazo-dyestuff which corresponds to the following formula
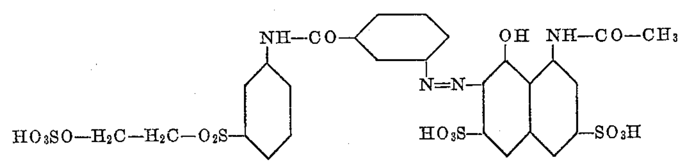
No references cited.